(12) United States Patent
Fukuda et al.

(10) Patent No.: US 7,448,479 B2
(45) Date of Patent: Nov. 11, 2008

(54) HYDRAULIC DAMPING FORCE CONTROL UNIT, HYDRAULIC SHOCK ABSORBER, FRONT FORK FOR VEHICLE, AND HYDRAULIC ROTARY DAMPER

(75) Inventors: Hiromi Fukuda, Shizuoka (JP); Haruhiko Nakanosono, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 11/221,577

(22) Filed: Sep. 7, 2005

(65) Prior Publication Data
US 2006/0054434 A1 Mar. 16, 2006

(30) Foreign Application Priority Data
Sep. 15, 2004 (JP) ............................. 2004-268081

(51) Int. Cl.
*F16F 9/46* (2006.01)
(52) U.S. Cl. .................. 188/322.2; 188/266.2; 188/314
(58) Field of Classification Search ............. 188/266.6, 188/282.3, 313, 290, 266.2, 314, 322.2; 280/272, 280/276
See application file for complete search history.

(56) References Cited

U.S. PATENT DOCUMENTS

| 5,078,240 A | 1/1992 | Ackermann et al. |
| 5,409,088 A * | 4/1995 | Sonsterod ................. 188/282.3 |
| 5,586,627 A * | 12/1996 | Nezu et al. ................ 188/266.6 |
| 5,588,510 A | 12/1996 | Wilke |
| 5,611,413 A | 3/1997 | Feigel |
| 5,996,748 A * | 12/1999 | Nezu et al. .................... 188/313 |
| 6,520,524 B1 * | 2/2003 | Costa .......................... 280/276 |
| 2002/0157909 A1 * | 10/2002 | Hasegawa et al. ............ 188/290 |
| 2003/0146594 A1 * | 8/2003 | Bunya et al. ................. 280/272 |
| 2003/0234508 A1 * | 12/2003 | Hanawa et al. ............... 280/272 |
| 2004/0211632 A1 * | 10/2004 | Yamada ....................... 188/290 |

FOREIGN PATENT DOCUMENTS

| EP | 0 504 624 | 2/1992 |
| JP | 06-330977 | 11/1994 |
| WO | 91/17379 | 11/1991 |

* cited by examiner

*Primary Examiner*—Christopher P Schwartz
(74) *Attorney, Agent, or Firm*—Hogan & Hartson LLP

(57) ABSTRACT

A damping force is generated by keeping a damping force control valve closed when a piston of a hydraulic shock absorber starts to move from compression side dead center or expansion side dead center. A damping force control valve including a poppet valve for opening and closing a first fluid path is provided. A pilot pressure chamber defined from the fluid path by a valve element of the damping force control valve is provided. A linear solenoid and a pilot valve for increasing and reducing the hydraulic pressure in the pilot pressure chamber are provided. A check valve disposed in parallel with the damping force control valve is provided in a piston. A communication path for communication between the first fluid path downstream of the damping force control valve and the pilot pressure chamber is provided.

4 Claims, 11 Drawing Sheets

HYDRAULIC DAMPING FORCE CONTROL UNIT, HYDRAULIC SHOCK ABSORBER, FRONT FORK FOR VEHICLE, AND HYDRAULIC ROTARY DAMPER

BACKGROUND OF THE INVENTION

1. Field of the Invention

The present invention relates to a hydraulic damping force control unit, a hydraulic shock absorber, a front fork for a vehicle, and a hydraulic rotary damper which use a poppet valve to generate damping force.

2. Description of Related Art

One example of conventional hydraulic shock absorber having a damping force control valve is disclosed in Japanese Patent Document JP-B-3306526. The hydraulic shock absorber disclosed in JP-B-3306526 is for use in suspension systems of vehicles, and constructed with a hydraulic cylinder provided between the wheel side and the vehicle body frame side, damping force control valves provided in a hydraulic circuit of the hydraulic cylinder, and so forth.

The hydraulic cylinder is constructed with a cylinder body filled with hydraulic fluid, a piston which defines the inside of the cylinder body into a head side fluid chamber and a rod side fluid chamber, and so forth. The head side fluid chamber and the rod side fluid chamber are connected with each other through a hydraulic circuit including valves and an accumulator.

The hydraulic circuit includes a head side fluid path which connects the head side fluid chamber to the accumulator, a rod side fluid path which connects the rod side fluid chamber to the accumulator, a head side check valve provided on the head side fluid path to allow hydraulic fluid to flow toward the head side fluid chamber only, a rod side check valve provided on the rod side fluid path to allow hydraulic fluid to flow toward the rod side fluid chamber only, a compression side damping force control valve provided in parallel with the head side check valve, an expansion side damping force control valve provided in parallel with the rod side check valve, and so forth.

The compression side damping force control valve and the expansion side damping force control valve include a poppet valve, which is constructed such that its valve element to be described later is opened, when the check valve regulates the flow of hydraulic fluid to increase the hydraulic pressure, to generate damping force. The damping force control valves include a hydraulic fluid inlet connected to a fluid path located on the hydraulic cylinder side with respect to the check valve, a valve hole of which one end is located at the opening of the hydraulic fluid inlet, a hydraulic fluid outlet opening in the wall surface of the valve hole and connected to a fluid path located opposite the hydraulic cylinder with respect to the check valve, a valve element fitted and inserted in the valve hole so as to be reciprocally movable, a compression coil spring for urging the valve element in the closing direction (toward the hydraulic fluid inlet side), a pilot pressure chamber defined in the valve hole by the valve element, and so forth.

The valve element is formed in a cylinder having a tapered portion at its distal end. The tapered portion faces the hydraulic fluid inlet from inside the valve hole, and is formed to seat on a valve seat which is the opening edge of the hydraulic fluid inlet. When the damping force control valve is fully closed with the tapered portion seating on the valve seat, a portion of the tapered portion more centrally than the valve seat receives the hydraulic pressure at the hydraulic fluid inlet, and the outer circumference of the tapered portion located more internally of the valve hole than the valve seat receives the hydraulic pressure at the hydraulic fluid outlet.

The pilot pressure chamber is connected through a pilot path to a fluid path on the hydraulic cylinder side with respect to the check valve. At the middle of the pilot path is provided a relief valve which allows hydraulic fluid to flow to a fluid path located opposite the hydraulic cylinder with respect to the check valve when the hydraulic pressure in the pilot path has been increased to a predetermined value or higher.

According to the damping force control valve, when the hydraulic pressure in the fluid path located on the hydraulic cylinder side from the relief valve has exceeded the predetermined value to open the relief valve, the hydraulic pressure in the pilot pressure chamber is reduced, which results in the valve element being opened. As the valve element opens, hydraulic fluid passes through a space between the valve seat and the tapered portion to flow from the hydraulic fluid inlet into the valve hole, and then passes through the valve hole to be discharged through the hydraulic fluid outlet. At this time, the damping force control valve functions as a throttle to generate damping force. Hydraulic fluid discharged through the hydraulic fluid outlet flows toward the accumulator or the side of the other fluid chamber of the cylinder.

It should be noted that the applicant could not find any related art document closely related to the present invention by the time of filing the present patent application, except for the one specified in the related art document information section included herein.

When the hydraulic shock absorber is in an expansion stroke, for example, the rod side check valve is closed and thus hydraulic fluid passes through the expansion side damping force control valve and then through the head side check valve to flow into the head side fluid chamber.

Regarding the check valve, the elastic reaction force and the spring constant of its return spring are set to be higher, and the amount of valve lift is set to be smaller, in order to increase the responsiveness of the check valve when opened and closed. Therefore, a differential pressure is generated between the upstream side and the downstream side of the check valve when hydraulic fluid passes through it.

At this time, the pressure (differential pressure) which has occurred at the head side check valve is transmitted through the hydraulic fluid outlet of the compression side damping force control valve into the valve hole, which presses the outer circumference of the tapered portion in the opening direction to cause the valve element to be opened. In other words, when the hydraulic shock absorber is in the expansion stroke, the damping force control valve that should be on standby as closed is unfavorably opened.

When the frequency and amplitude of vibration of a wheel are relatively small, there is enough time before the expansion stroke of the hydraulic shock absorber ends. Thus, the flow rate of hydraulic fluid through the compression side damping force control valve and the differential pressure are gradually reduced, and along with that the hydraulic pressure is overcome by the elastic reaction force of the compression coil spring which is urging the valve element in the closing direction. This causes the valve element to be closed before the piston of the hydraulic shock absorber reaches dead center.

When the frequency and amplitude of vibration of a wheel are relatively large, however, the flow rate of pressurized fluid through the head side check valve is high and hence the differential pressure is large. This causes the compression side damping force control valve to be opened to a relatively large degree. Thus, occasionally, there is not enough time for the valve element to be closed before the piston of the hydraulic shock absorber reaches dead center in the expansion stroke and the valve is kept opened even after the hydraulic shock absorber has shifted to a compression stroke.

If the compression side damping force control valve is opened when the hydraulic shock absorber has shifted from the expansion stroke to the compression stroke as described above, the compression side damping force control valve cannot generate a magnitude of damping force necessary at the moment. When the hydraulic shock absorber has shifted to the compression stroke, the hydraulic pressure on the upstream side of the compression side damping force control valve (or the hydraulic pressure in the hydraulic fluid inlet and in the pilot pressure chamber) is gradually increased. The compression side damping force control valve is abruptly closed from its opened state by the elastic damping force of the compression coil spring and the hydraulic pressure in the pilot pressure chamber, and then the valve element is gradually opened to generate damping force.

In other words, the damping force to be generated by the compression side damping force control valve at this time is unstable (the damping force waveform is disordered. In order for the damping force to be increased according to the increase in the speed of the hydraulic shock absorber, the damping force control valve needs to be closed when the piston starts to move. The above description is based on the case where the hydraulic shock absorber shifts from the expansion stroke to the compression stroke. On the contrary, when the hydraulic shock absorber shifts from the compression stroke to the expansion stroke, the expansion side damping force control valve is on standby as opened, which causes the same problem as described above.

The damping force of such a conventional hydraulic shock absorber changes as shown for example in FIG. 11. FIG. 11 is a graph showing the relationship between the moving speed of a piston and the damping force. As shown in FIG. 11, because the compression side damping force control valve, which should be closed, is opened when the hydraulic shock absorber has shifted from the expansion stroke to the compression stroke, the damping force is unstable in the range indicated by symbol a in FIG. 11. Also, because the expansion side damping force control valve, which should be closed, is opened when the hydraulic shock absorber has shifted from the compression stroke to the expansion stroke, the damping force is unstable in the range indicated by symbol b in FIG. 11.

SUMMARY OF THE INVENTION

The present invention has been made to solve such problems, and therefore has an object to generate damping force properly by keeping a damping force control valve closed surely when a piston of a hydraulic shock absorber starts to move from compression side dead center or expansion side dead center.

In order to achieve the above object, a hydraulic damping force control unit according to the present invention includes a poppet valve for opening and closing a fluid path, a pilot pressure chamber defined from the fluid path by a valve element of the poppet valve, a damping force setting means for increasing and decreasing the hydraulic pressure in the pilot pressure chamber, and a check valve provided on the fluid path in parallel with the poppet valve to allow pressurized fluid to flow from the downstream side to the upstream side of the poppet valve only. In one aspect, the hydraulic damping force control unit further includes a communication path for communication between the fluid path downstream of the poppet valve and the pilot pressure chamber.

The hydraulic shock absorber includes the hydraulic damping force control unit in at least one of a fluid path through which hydraulic fluid flows out of a rod side fluid chamber of a hydraulic cylinder and a fluid path through which hydraulic fluid flows out of a head side fluid chamber of the hydraulic cylinder.

A front fork for a vehicle having the hydraulic damping force control unit in each of paired left and right hydraulic shock absorbers. In one aspect, the damping force control unit is connected to a rod side fluid chamber in one of the paired left and right hydraulic shock absorbers, and the damping force control unit is connected to a head side fluid chamber in the other of the paired left and right hydraulic shock absorbers.

A hydraulic rotary damper includes the hydraulic damping force control unit connected to at least one of two fluid chambers defined by a movable partition wall, which swings in conjunction with a member to be shock absorbed.

According to the present invention, when the hydraulic pressure on the downstream side of the poppet valve is higher than that on the upstream side thereof, the hydraulic pressure on the downstream side is transmitted to the pilot pressure chamber to urge the valve element of the poppet valve in the closing direction.

Thus, according to the damping force control unit of the present invention, the relatively high hydraulic pressure can be utilized to keep the poppet valve closed while it is on standby. Consequently, the poppet valve, for example, connected to a hydraulic cylinder, can generate suitable damping force right from the moment when the hydraulic cylinder has shifted from the compression stroke to the expansion stroke or vice versa.

The poppet valve of a pressure control unit that is on standby can be kept closed when the piston starts to move after passing over dead center, for example, when the hydraulic cylinder shifts from the compression stroke to the expansion stroke or vice versa. Thus, it is possible to provide a hydraulic shock absorber which generates constant and suitable damping force.

When the hydraulic shock absorber is expanded, the poppet valve of the damping force control unit that is connected to the head side fluid chamber is on standby as closed, and when the hydraulic shock absorber is compressed, the poppet valve of the damping force control unit that is connected to the rod side fluid chamber is on standby as closed. Therefore, the poppet valve of a pressure control unit that is on standby can be kept closed when the piston starts to move after passing over dead center, for example, when the hydraulic cylinder of the hydraulic shock absorber shifts from the compression stroke to the expansion stroke or vice versa. Thus, it is possible to provide a front fork which generates constant and suitable damping force.

Additionally, in the front fork of this invention, since one of the paired left and right hydraulic shock absorbers generates damping force in the compression stroke, and the other shock absorber generates damping force in the expansion stroke, damping force can be generated in both the compression stroke and the expansion stroke, using the two hydraulic cylinders and the two damping force control units. Thus, the size of pistons and rods can be selected independently between the hydraulic shock absorber, which generates damping force in the compression stroke and the hydraulic shock absorber, which generates damping force in the expansion stroke. This produces an additional effect that the degree of freedom in setting the maximum damping force and the maximum working pressure is increased.

When the movable partition wall is moved from the one fluid chamber side toward the other fluid chamber side, the poppet valve of the damping force control unit that is connected to the one fluid chamber is on standby as closed, and when the movable partition wall is moved from the other fluid chamber side toward the one fluid chamber side, the poppet valve of the damping force control unit that is connected to the other fluid chamber is on standby as closed. Therefore, the poppet valve of a pressure control unit that is on standby can be closed when the moving direction of the movable partition wall of the rotary damper is changed. Thus, it is possible to provide a rotary damper, which generates constant and suitable damping force.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Reference will now be made to the drawings wherein like numerals refer to like parts throughout.

First Embodiment

An embodiment of a hydraulic damping force control unit according to the present invention will be hereinafter described in detail with reference to FIGS. 1 through 3. The description will be based on an example where the hydraulic damping force control unit according to the present invention is applied to a rear cushion unit of a motorcycle.

Figure 1:
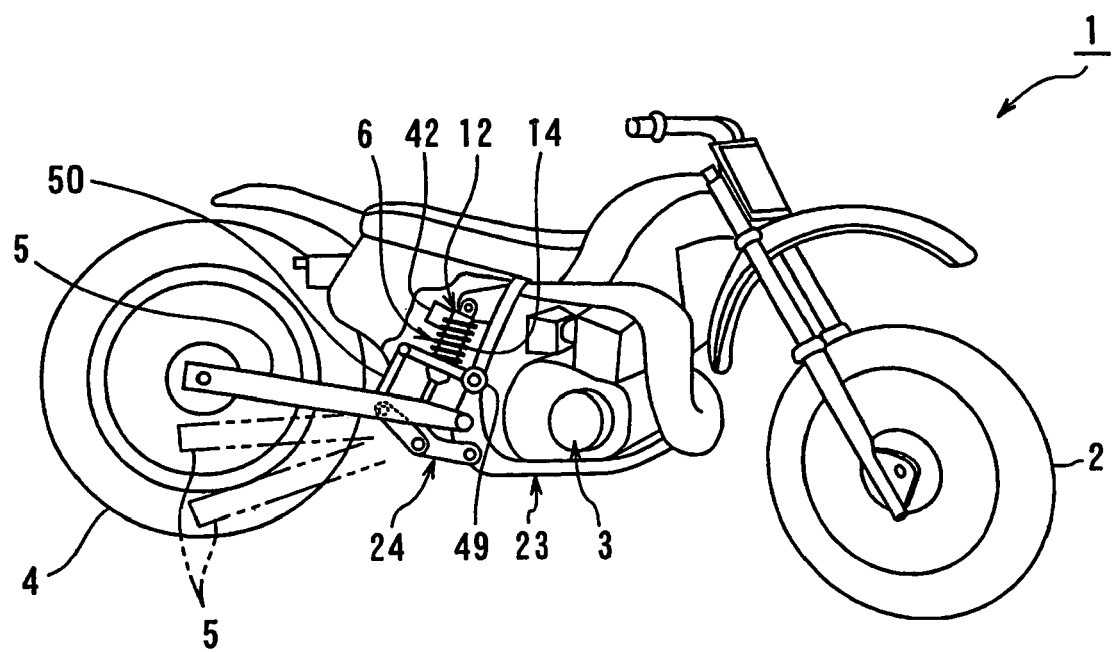
FIG. 1 is a side view of a motorcycle having a hydraulic damping force control unit according to the present invention.
Figure 3:
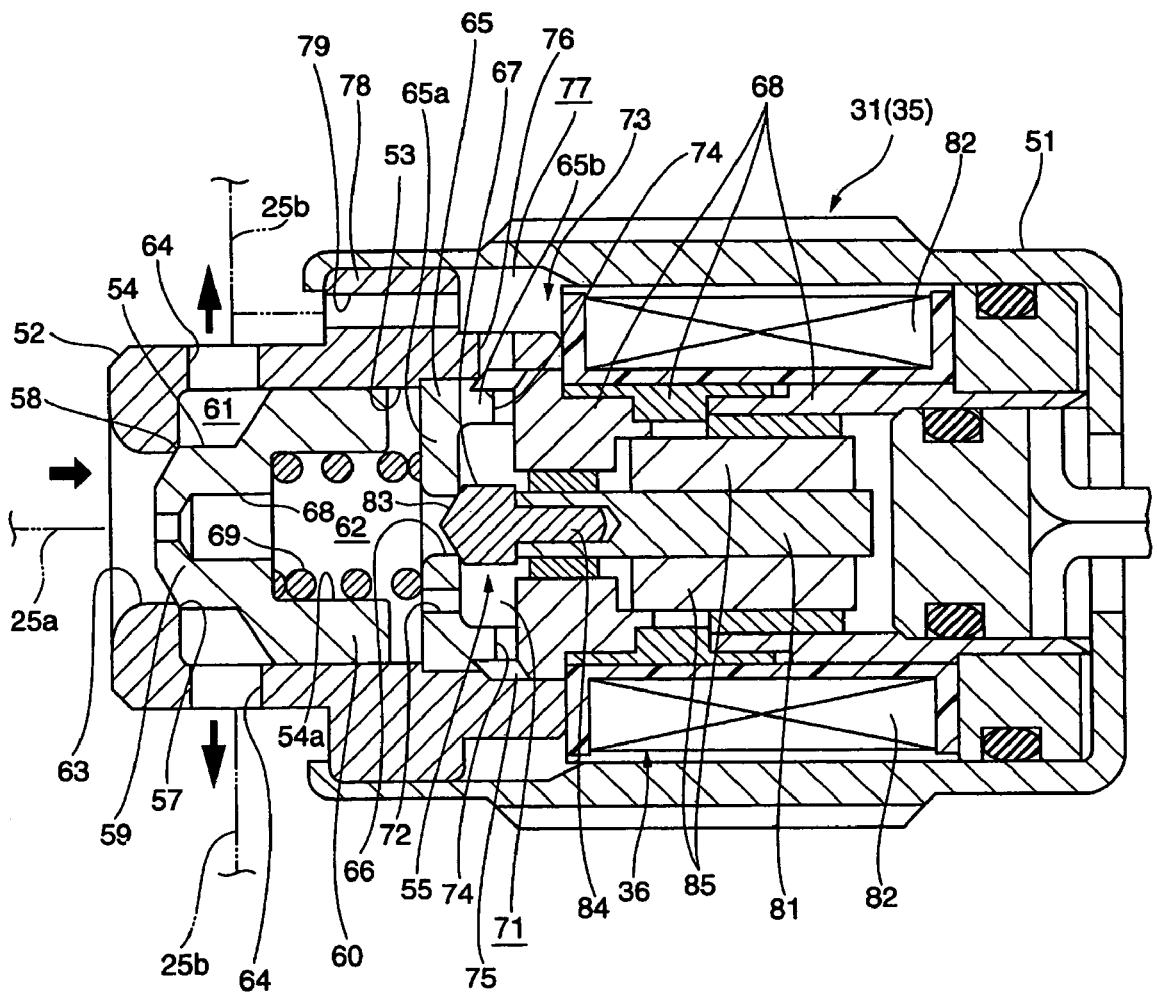
FIG. 3 is a sectional view of a damping force control valve.
Figure 4:
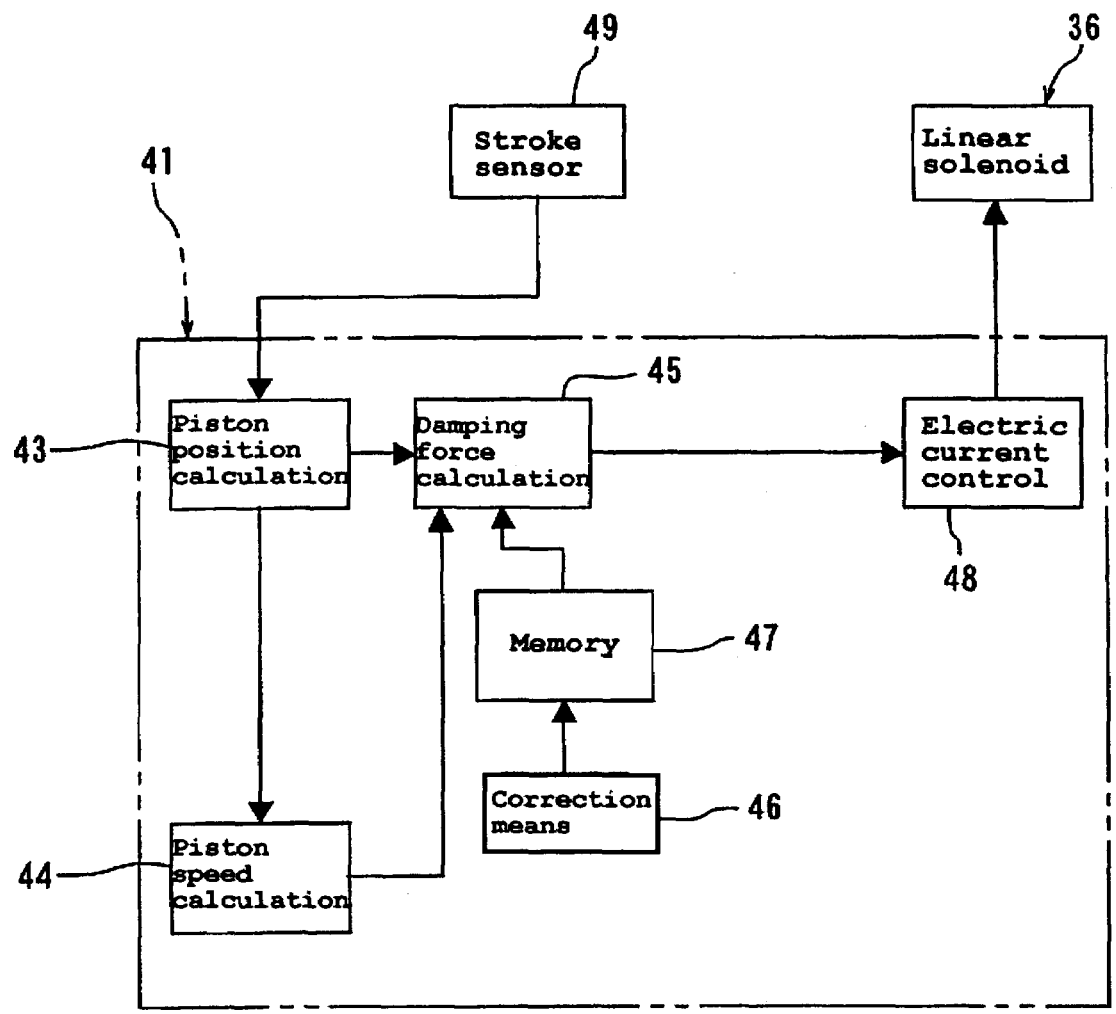
FIG. 4 is a block diagram showing the construction of the hydraulic damping force control unit according to the present invention.

FIG. 1 is a side view of a motorcycle having a hydraulic damping force control unit according to the present invention. FIG. 2 is a diagram showing the construction of the hydraulic damping force control unit according to the present invention. FIG. 3 is a sectional view of a damping force control valve. FIG. 4 is a block diagram showing the construction of the hydraulic damping force control unit according to the present invention.

In the drawings, reference numeral 1 denotes a motorcycle according to this embodiment. Reference numeral 2 denotes a front wheel, 3 an engine, 4 a rear wheel, 5 a rear arm, and 6 a rear cushion unit, of the motorcycle 1. In the motorcycle 1, a hydraulic damping force control unit 11 (see FIG. 2) according to the present invention is used in the rear cushion unit 6.

Figure 2:
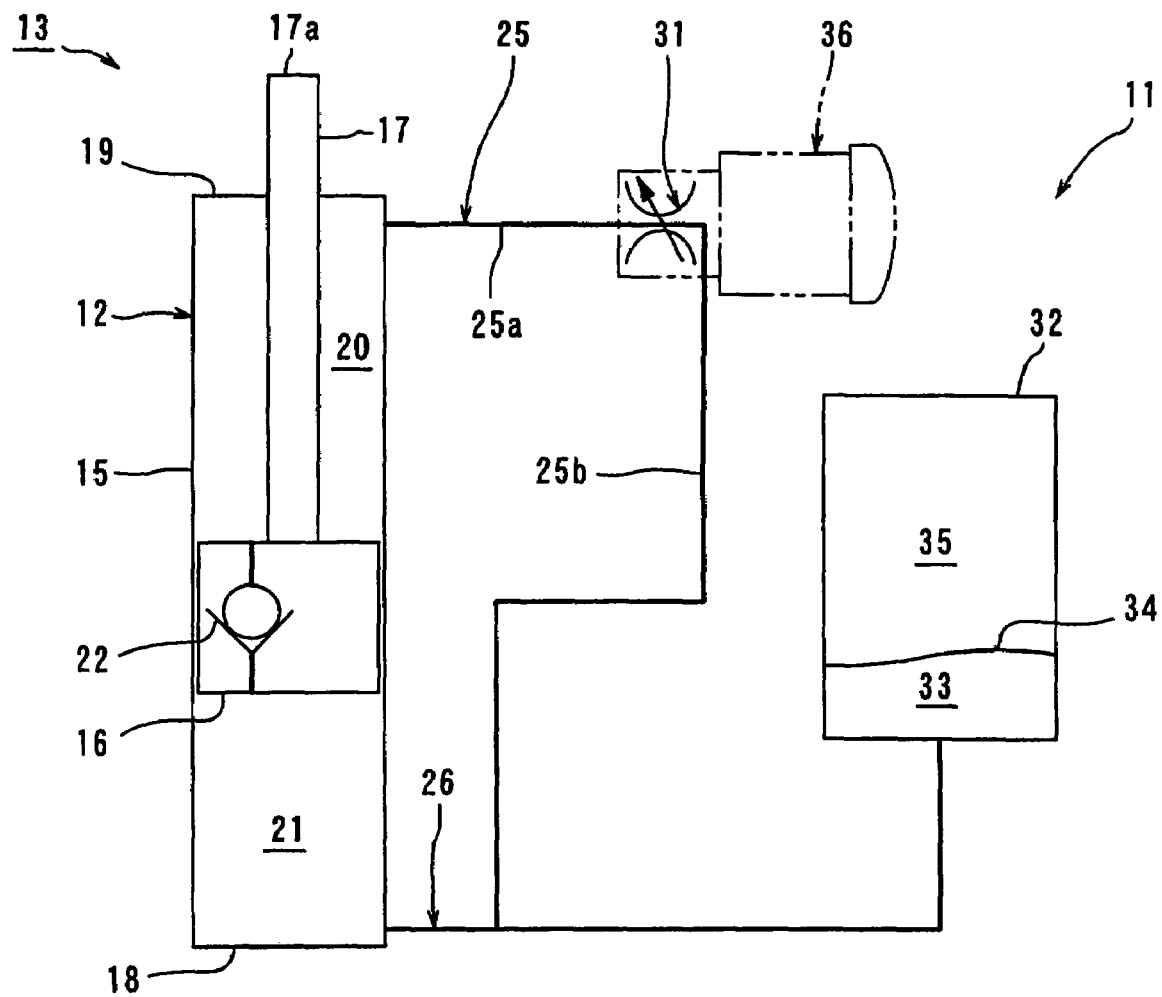
FIG. 2 is a diagram showing the construction of the hydraulic damping force control unit according to the present invention.

As shown in FIGS. 1 and 2, the rear cushion unit 6 is made up of a hydraulic shock absorber 13 having a hydraulic cylinder 12 and the hydraulic damping force control unit 11 according to the present invention assembled thereto, and a compression coil spring 14.

The hydraulic cylinder 12 is constructed with a tube 15, a piston 16 movably inserted in the tube 15, a piston rod 17 connected to the piston 16, a head cover 18 which closes one end of the tube 15, and a rod cover 19 which closes the other end of the tube 15. The inside of the hydraulic cylinder 12 is filled with hydraulic fluid.

The piston 16 defines the inside of the hydraulic cylinder 12 into a rod side fluid chamber 20 and a head side fluid chamber 21. In this embodiment, the action of the piston rod 17 of being retracted out of the tube 15 to increase the overall length of the hydraulic cylinder 12 is described as "the hydraulic shock absorber is expanded", and this stroke is referred to as an expansion stroke. On the other hand, the action of the piston rod 17 of being advanced into the tube 15 to reduce the overall length of the hydraulic shock absorber 11 is described as "the hydraulic shock absorber is compressed", and this stroke is referred to as a compression stroke.

The piston 16 is provided with a check valve 22 which allows hydraulic fluid to pass from the head side fluid chamber 21 to the rod side fluid chamber 20 only.

An end of the hydraulic cylinder 12, on the lower side in FIG. 2, is pivotally supported on a vehicle body frame 23 (see FIG. 1) of the motorcycle 1. On the other hand, a rod end 17a of the piston rod 17 is coupled to the rear arm 5 via a link mechanism 24.

As shown in FIG. 2, an end of a first fluid path 25 of the hydraulic damping force control unit 11 according to the present invention is connected to the rod side fluid chamber 20, and an end of a second fluid path 26 is connected to the head side fluid chamber 21. The first fluid path 25 is provided with a damping force control valve 31 to be described later. The second fluid path 26 is connected to a fluid chamber 33 of an accumulator 32. The other end of the first fluid path 25 is connected to the second fluid path 26, between the hydraulic cylinder 15 and the accumulator 32. The accumulator 32 is constructed such that the fluid chamber 33 and a gas chamber 35 adjoin each other via a movable partition wall 34. The gas chamber 35 is filled with high-pressure gas by which pressure the hydraulic fluid in the fluid chamber 33 is urged.

The damping force control valve 31, of which internal structure will be described specifically later, is constructed to allow hydraulic fluid to flow to the downstream side when the hydraulic pressure on the upstream side (on the cylinder 12 side) has exceeded a predetermined opening pressure. The opening pressure is increased and decreased by a linear solenoid 36 (see FIG. 3) provided for the damping force control valve 31. The linear solenoid 36 is controlled to operate by a control unit 41 (see FIG. 4) to be described later.

The damping force control valve 31 is connected to the hydraulic cylinder 12 through the fluid paths 25 and 26 so as to be parallel with the check valve 22. The damping force control valve 31 increases and decreases the amount of hydraulic fluid which flows through the first fluid path 25 from the left side to the right side in FIG. 2 when the piston rod 17 of the hydraulic cylinder 12 is retracted to increase the overall length of the hydraulic shock absorber 13, to control the magnitude of damping force to be generated during that time. The damping force control valve 31 and the check valve 22 of the piston 16 constitute the hydraulic damping force control unit 11 according to the present invention. The damping force control unit 11 is accommodated and supported in a valve case 42 provided on a side of the rear cushion unit 6 as shown in FIG. 1.

As shown in FIG. 4, the control unit 41 for controlling the damping force control valve 31 is made up of piston position calculation means 43, piston speed calculation means 44, damping force calculation means 45, damping force correction means 46, a memory 47, and electric current control means 48. The control unit 41 is connected to the linear solenoid 36 of the damping force control valve 31, and a stroke sensor 49. As shown in FIG. 1, the stroke sensor 49 in this embodiment is coupled to the rear arm 5 via a link 50 so as to detect the amount of swing of the rear arm 5.

The piston position calculation means 43 is constructed to obtain by calculation the position of the piston 16 of the hydraulic shock absorber 13 from the amount of swing of the rear arm 5 detected by the stroke sensor 49.

The piston speed calculation means 44 is constructed to obtain the moving speed of the piston 16 by detecting, for example, at regular intervals, the position of the piston 16 obtained by the piston position calculation means 43.

The damping force calculation means 45 is constructed to obtain by calculation a target value of damping force based on the position of the piston 16 detected by the piston position calculation means 43, the moving speed of the piston 16 detected by the piston speed calculation means 44, and a correction value stored in the memory 47. The correction value is set by the damping force correction means 46. The damping force correction means 46 is constructed to select by human operation one correction value out of plural correction values stored in the memory 47, so as to increase and decrease the damping force of the hydraulic shock absorber 13, for example, according to operation by a rider.

The target value of damping force obtained by the damping force calculation means 45 is set to be generally proportional to the moving speed of the piston 16 of the hydraulic shock absorber 13.

The specific structure of the damping force control valve 31 will be described in detail with reference to FIG. 3. The damping force control valve 31 is structured to have the linear solenoid 36 and a pilot valve 55, which will be described later, assembled to a poppet valve. That is, the damping force control valve 31 is constructed with a solenoid cover 51 formed in a bottomed cylinder, a tubular valve casing 52 secured to the opening of the solenoid cover 51, a valve element 54 fitted in a valve hole 53 in the valve casing 52 so as to be reciprocally movable, a pilot valve 55 for controlling the movement of the valve element 54, the linear solenoid 36 for urging the pilot valve 55 in the closing direction, and a compression coil spring 69. The linear solenoid 36, the pilot valve 55, the control unit 41, and so forth constitute the damping force setting means of the present invention.

The valve element 54 is formed in a stepped bottomed cylinder, having a small diameter portion 59 formed with a seat surface 58 for seating on a valve seat 57 of the valve casing 52, and a large diameter portion 60 to be fitted with the valve hole 53, disposed coaxially with each other.

The inside of the valve hole 53 is fitted with the valve element 54 and defined by it into a fluid chamber 61 and a pilot pressure chamber 62. The fluid chamber 61 is in communication with an upstream portion 25a of the first fluid path 25 (on the hydraulic cylinder 12 side) through an upstream hole 63, of which opening edge on the downstream side is defined by the valve seat 57. The fluid chamber 61 is also in communication with a downstream portion 25b of the first fluid path 25 (on the second fluid path 26 side, or on the accumulator 32 side) through an outlet hole 64 which opens in the wall surface defining the valve hole 53.

The pilot pressure chamber 62 is defined by walls including the inner wall surface defining the valve hole 53, the valve element 54, a pilot pressure chamber defining wall member 65 which closes an end of the valve hole 53, and a pilot valve element 67 which opens and closes a through hole 66 formed by drilling at the axial center of the wall member 65. The pilot pressure chamber 62 is in communication with the inlet hole 63 through a pilot path 68 passing through the axis of the small diameter portion of the valve element 54.

The wall member 65 is formed in a bottomed cylinder having a circular bottom wall 65a opposing the valve element 54. The wall member 65 is fixed to the valve casing 52 with a circumferential wall 65b, provided along the outer circumference of the bottom wall 65a, located opposite the valve element 54. The wall member 65 is fixed as interposed between a tubular housing 68 of the linear solenoid 36 to be described later and the valve casing 52. The compression coil spring 69 for urging the valve element 54 in the closing direction is elastically mounted in a space between the bottom wall 65a of the wall member 65 and an inside recess 54a of the valve element 54.

A radially outer portion of the bottom wall 65a relative to the through hole 66 (on the lower side in FIG. 3) is formed by drilling with a pressure conduction path 72 for communication between the pilot pressure chamber 62 and a downstream side fluid chamber 71, which is a recess inside the circumferential wall 65b. The pressure conduction path 72 is formed to extend in parallel with the axis of the valve hole 53. The distal end of the circumferential wall 65b is formed with recessed grooves 74, which constitute a part of a communication path 73 for communication between the downstream side fluid chamber 71 and the downstream portion 25b of the first fluid path 25.

A plurality of the recessed grooves 74 are formed to extend radially in the end surface of the circumferential wall 65b. The opening portions of the grooves are closed by the end surface of the tubular housing 68 of the linear solenoid 36. The communication path 73 includes the recessed grooves 74, an annular fluid chamber 75 defined between the circumferential wall 65b and the inner wall surface of the valve casing 52, a fluid hole 76 radially passing through the valve casing 52, an annular fluid chamber 77 defined between the outer circumferential surface of the valve casing 52 and the inner circumferential surface of the solenoid cover 51, and a fluid hole 79 axially passing through an outer circumferential flange 78 of the valve casing 52. The downstream side fluid chamber 71, the pressure conduction path 72, and the communication path 73 constitute the communication path for communication between the pilot pressure chamber and the downstream side fluid path of the present invention.

The pilot valve 55 is constructed with the wall member 65, the valve element 67 located opposite the pilot pressure chamber 62 across the wall member 65, a plunger 81 of the linear solenoid 36 for supporting the valve element 67, the tubular housing 68 for supporting the plunger 81 so as to be reciprocally movable, and so forth. The tubular housing 68 is formed by assembling plural cylindrical members together. The linear solenoid 36 is constructed with the plunger 81, the tubular housing 68, a coil 82 provided on the outer side of the tubular housing 68, the solenoid cover 51 for covering the coil 82, and so forth.

One end of the valve element 67 of the pilot valve 55 is formed with a tapered surface 83, and its other end is formed with a support shaft 84. The tapered surface 83 is formed to contact the opening edge of the through hole 66 over the entire circumference as the valve element 67 is moved toward the wall member 65 side. The support shaft 84 is fitted with and supported by the plunger 81.

The linear solenoid 36 is constructed such that the plunger 81 is moved toward the pilot pressure chamber 62 side (toward the left side in FIG. 2) to generate urging force which pushes the valve element 67 of the pilot valve 55 in the closing direction as the coil 82 is energized, with the urging force increased and decreased according to the amount of electric current.

The overall length of the hydraulic shock absorber 13 having the constructed damping force control valve 31 is increased (the hydraulic shock absorber 13 is expanded) by the downward movement of the rear wheel 4 of the motorcycle 1 relative to the vehicle body frame 23, and reduced (the hydraulic shock absorber 13 is compressed) by the movement of the rear wheel 4 in the opposite direction. For example, when the hydraulic shock absorber 13 is to be expanded, the check valve 22 is closed which increases the hydraulic pressure in the rod side fluid chamber 20 and the upstream portion 25a of the first fluid path 25. When that hydraulic pressure has exceeded the opening pressure for the damping force control valve 31, the damping force control valve 31 is opened to allow hydraulic fluid to flow to the downstream side. When the damping force control valve 31 is opened in this manner, it functions as a throttle which causes the hydraulic shock absorber 13 to generate damping force. The magnitude of the damping force is controlled by the control unit 41 increasing and decreasing the electric current for the linear solenoid 36.

The operation of the damping force control valve 31 will be described in detail. When the differential pressure between the hydraulic pressure in the inlet hole 63 and that in the outlet hole 64 (in the fluid chamber 61) is small, for example, when the hydraulic shock absorber 13 is at a halt, the damping force control valve 31 is closed with the valve element 54 pushed against the valve seat 57 by the elastic reaction force of the compression coil spring 69. When the hydraulic pressure in the inlet hole 63 of the damping force control valve 31 is increased by the expansion of the hydraulic shock absorber 13, that hydraulic pressure is transmitted to the pilot pressure chamber 62 through the pilot path 68 and, thus, the valve element 54 receives that hydraulic pressure from both the inlet hole 63 side and the pilot pressure chamber 62 side.

When the hydraulic pressure in the pilot pressure chamber 62 is increased as that in the inlet hole 63 is increased, and has become greater than the force which urges the valve element 67 of the pilot valve 55 in the closing direction, or in other words the urging force of the linear solenoid 36, the pilot valve 55 is opened to allow the pressurized fluid to flow out of the pilot pressure chamber 62 into the downstream side fluid chamber 71. As a result, the hydraulic pressure in the pilot pressure chamber 62 is decreased to be as low as that in the outlet hole 64. The decrease in the hydraulic pressure in the pilot pressure chamber 62 causes the pilot valve 55 to be closed.

When the hydraulic pressure in the pilot pressure chamber 62 is decreased, the valve element 54 is pushed by the hydraulic pressure in the inlet hole 63 to be moved toward the pilot pressure chamber 62 side, and the pressurized fluid in the inlet hole 63 passes through a space between the small diameter portion 59 of the valve element 54 and the valve seat 57 to flow into the fluid chamber 61. Thus, in the damping force control valve 31 of this embodiment, increasing and decreasing the hydraulic pressure in the pilot pressure chamber 62 (which is generally the same as that in the inlet hole 63) at which the pilot valve 55 is opened, by increasing and decreasing the urging force of the linear solenoid 36, can control the opening and closing movement of the valve element 54. This allows the damping force control valve 31 to control the damping force to be generated.

When the piston 16 of the hydraulic shock absorber 13 has reached dead center and its movement has shifted from the expansion stroke to the compression stroke, the check valve 22 which has been closed so far can now open. Regarding the check valve 22, the elastic reaction force and the spring constant of its return spring, the amount of valve lift, and so forth are set so as to increase the responsiveness of the check valve 22 when opened and closed, which causes the check valve 22 to have a relatively large pressure loss, compared to the first and second fluid paths 25 and 26 and so forth. Thus, when the check valve 22 opens in the compression stroke, a differential pressure is generated between the upstream side and the downstream side of the check valve 22.

After a shift from the expansion stroke to the compression stroke, the differential pressure between the upstream side (head side fluid chamber 21) and the downstream side (rod side fluid chamber 20) of the check valve 22, through which the hydraulic fluid should flow smoothly, becomes large, with the hydraulic pressure in the downstream portion 25b higher than that in the upstream portion 25a of the first fluid path 25. Conventional hydraulic shock absorbers have had a problem that such a large differential pressure between the upstream side and the downstream side of the check valve causes the damping force control valve to be opened unnecessarily.

In the hydraulic damping force control unit 11 according to the present invention, however, even when the hydraulic shock absorber 13 is in the compression stroke and the hydraulic pressure in the head side fluid chamber 21 on the upstream side of the check valve 22 has become relatively high as described above, that pressure is transmitted via the second fluid path 26, the downstream portion 25b of the first fluid path 25, and the communication path in the damping force control valve 31 (including the downstream side fluid chamber 71, the pressure conduction path 72, the recessed grooves 74, the annular fluid chamber 75, the fluid hole 76, the annular fluid chamber 77, and the fluid hole 79) to the pilot pressure chamber 62, which causes the valve element 54 to be closed.

Thus, the damping force control valve 31 is on standby as closed when the hydraulic shock absorber 13 is in the compression stroke. In other words, the hydraulic damping force control unit 11 of this embodiment allows the hydraulic shock absorber 13 to shift from the compression stroke to the expansion stroke with the damping force control valve 31 closed.

Therefore, the hydraulic damping force control unit 11 can cause the damping force control valve 31 to generate suitable damping force from the moment when the hydraulic shock absorber 13 shifts from the compression stroke to the expansion stroke.

Second Embodiment

Aside from the foregoing exemplary embodiment where damping force is generated only when the hydraulic shock absorber is in the expansion stroke, another construction is possible where damping force is generated also in the compression stroke. An exemplary embodiment with such a construction will be described in detail with reference to FIGS. 5 through 7.

Figure 5:
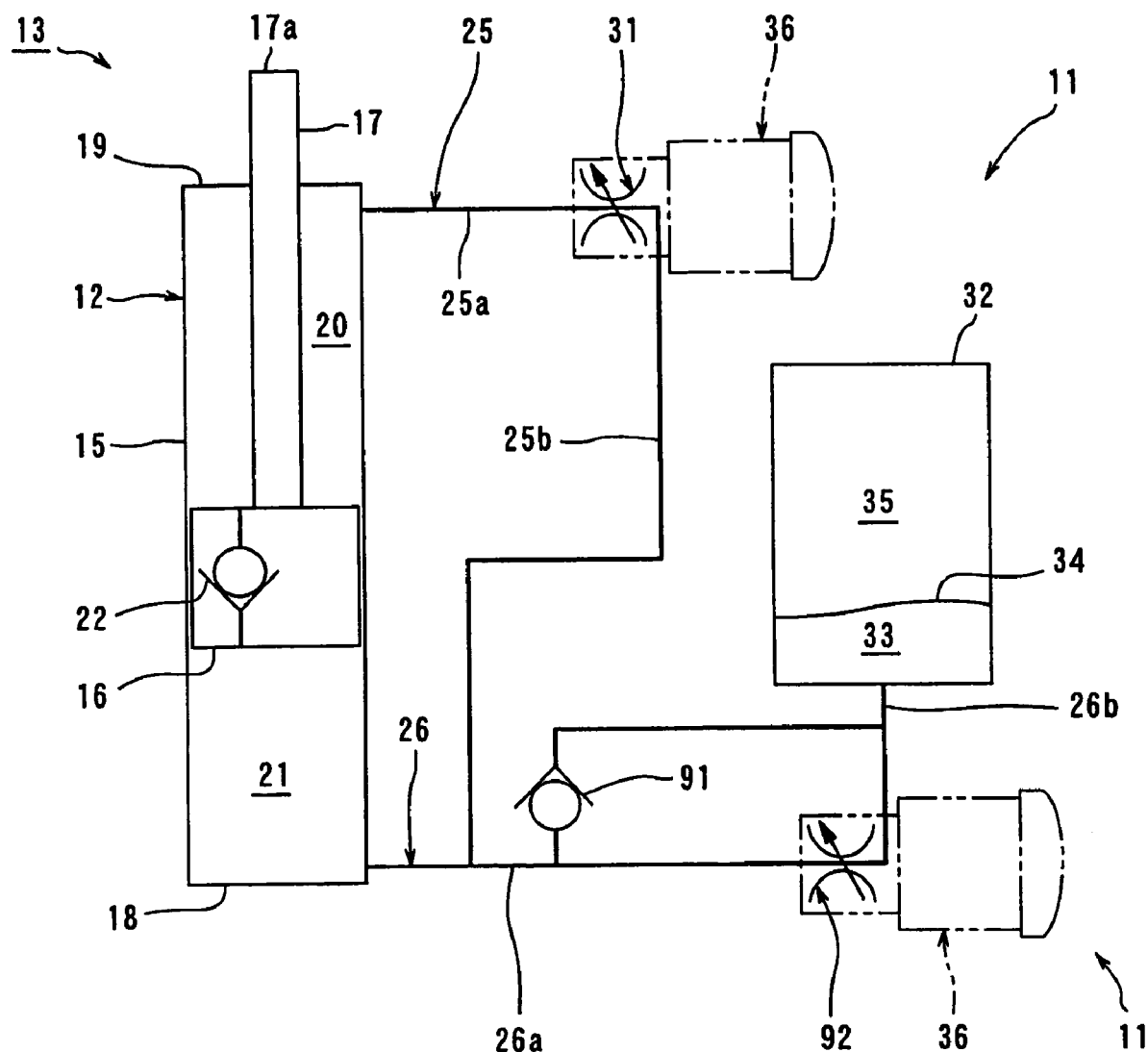
FIG. 5 is a diagram showing the construction of a hydraulic shock absorber having two damping force control valves connected to a single hydraulic cylinder.
Figure 6:
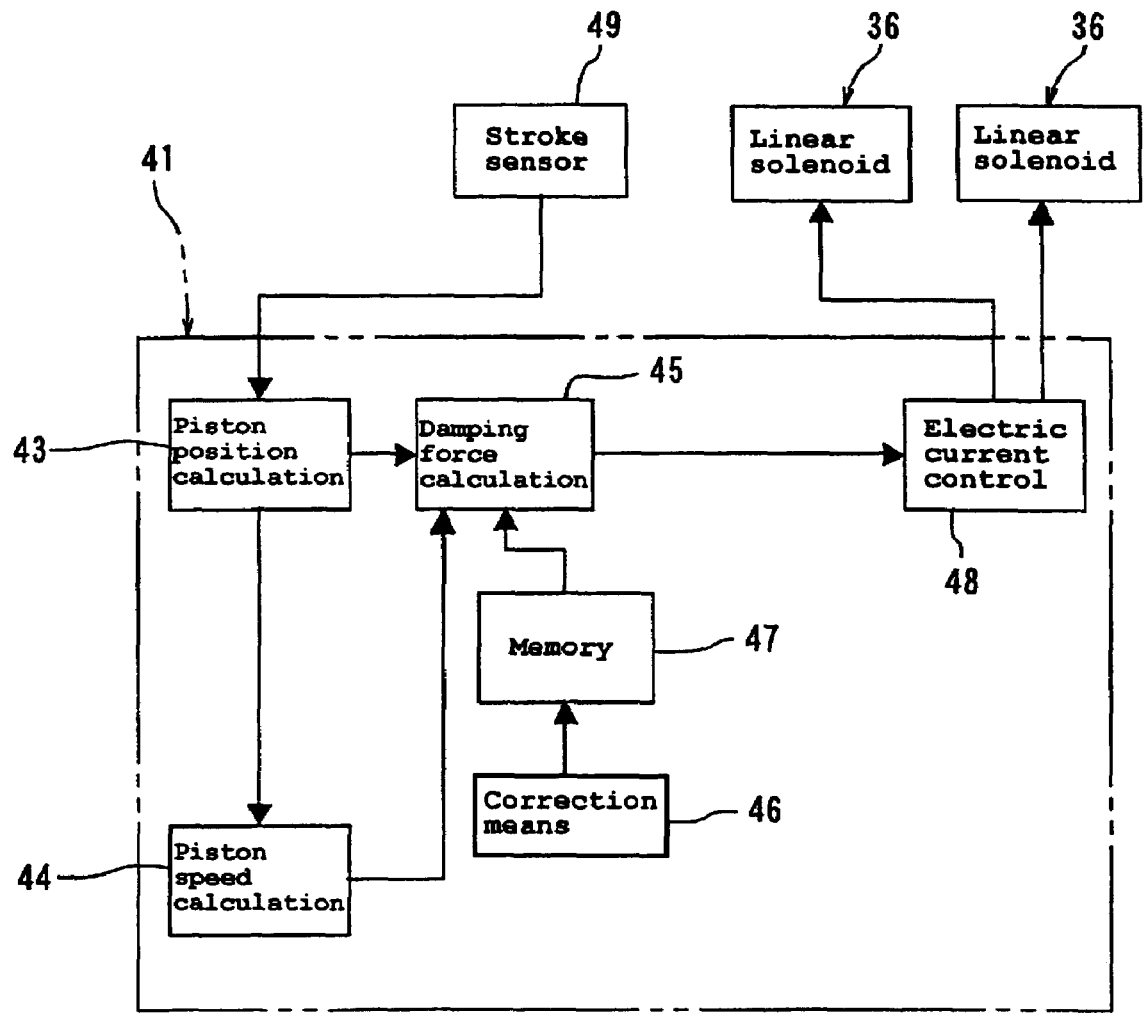
FIG. 6 is a block diagram showing the construction of a control system with the two damping force control valves.
Figure 7:
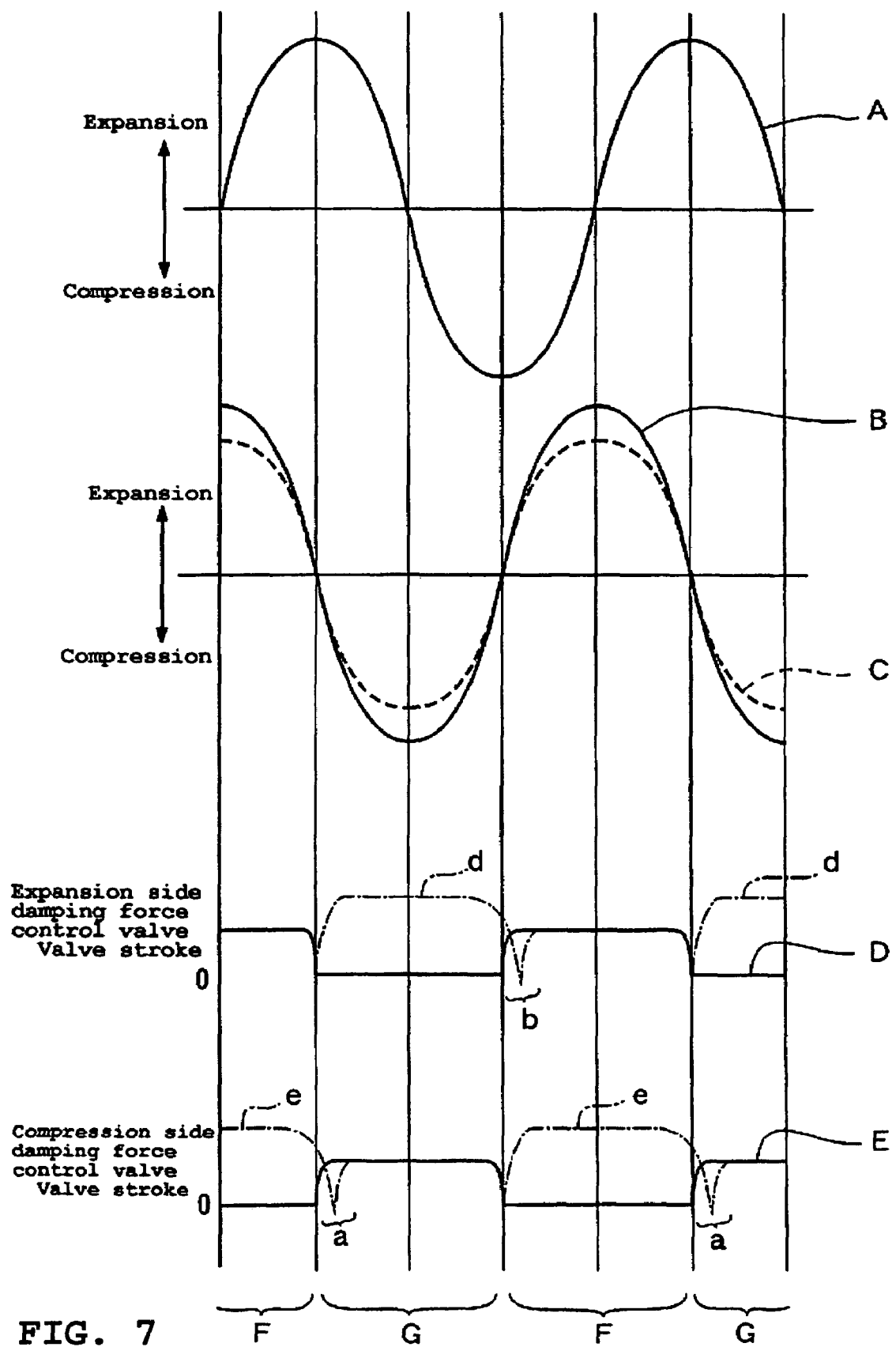
FIG. 7 is a graph showing the operation of the hydraulic shock absorber and the damping force control valves.

FIG. 5 is a diagram showing the construction of a hydraulic shock absorber having two damping force control valves connected to a single hydraulic cylinder. FIG. 6 is a block diagram showing the construction of a control system with the two damping force control valves. FIG. 7 is a graph showing the operation of the hydraulic shock absorber and the damping force control valves. In the drawings, components identical or equivalent to those described in relation to FIGS. 1 to 4 are denoted by the same reference numerals, and their detailed descriptions will not be repeated as appropriate.

As shown in FIG. 5, the hydraulic damping force control unit 11 of this embodiment is provided with a check valve 91 and a damping force control valve 92, disposed in parallel with each other. The check valve 91 is constructed to allow hydraulic fluid to flow from the accumulator 32 to the head side fluid chamber 21 in the hydraulic cylinder 15 only. The damping force control valve 92 is structured in the same way as the other damping force control valve 31. The upstream hole 63 and the outlet hole 64 of the damping force control valve 92 are connected to an upstream portion 26a and a downstream portion 26b of the second fluid path 26, respectively. For differentiation between the two damping force control valves, the one provided on the first fluid path 25 and the other provided on the second fluid path 26 will be hereinafter referred to as an expansion side damping force control valve 31 and a compression side damping force control valve 92, respectively.

The linear solenoid 36 of the compression side damping force control valve 92 is connected to the electric current control means 48 as shown in FIG. 6, and controlled to operate by the control unit 41 in the same manner as the linear solenoid 36 of the expansion side damping force control valve 31 is controlled.

In the damping force control unit 11 of this embodiment, when the hydraulic shock absorber 13 is in the expansion stroke, pressurized fluid flows into the head side fluid chamber 21 through the first fluid path 25 and the expansion side damping force control valve 31, and also into the head side fluid chamber 21 through the check valve 91 from the accumulator 32. Thus, in this stroke, the expansion side damping force control valve 31 generates damping force. At this time, the hydraulic pressure on the upstream side (on the accumulator 32 side) of the check valve 91 is relatively increased, and that hydraulic pressure is transmitted from the outlet hole 64 to the pilot pressure chamber 62 of the compression side damping force control valve 92. Thus, the compression side damping force control valve 92 is on standby as closed when the hydraulic shock absorber 13 is in the expansion stroke.

When the piston 16 of the hydraulic shock absorber 13 has reached dead center and shifted to the compression stroke, hydraulic fluid in the head side fluid chamber 21 passes through the check valve 22 of the piston 16 to flow into the rod side fluid chamber 20, and an amount of hydraulic fluid corresponding to the volume increase of the piston rod 17 flows out of the head side fluid chamber 21 into the second fluid path 26. The hydraulic fluid which has flowed into the second fluid path 26 passes through the compression side damping force control valve 92 to flow into the accumulator 33. In other words, when the hydraulic shock absorber 13 is in the compression stroke, damping force is generated as pressurized fluid passes through the compression side damping force control valve 92.

When the hydraulic shock absorber 13 is in the compression stroke, the hydraulic pressure on the upstream side (on the head side fluid chamber 21 side) of the check valve 22 of the piston 16 is relatively increased, and that hydraulic pressure is transmitted from the outlet hole 64 to the pilot pressure chamber 62 of the expansion side damping force control valve 31. Thus, the expansion side damping force control valve 31 is on standby as closed when the hydraulic shock absorber 13 is in the compression stroke.

The operation of the hydraulic damping force control unit 11 of this embodiment is shown in FIG. 7. In FIG. 7, a solid line A indicates changes in the moving direction of the piston 16 of the hydraulic shock absorber 13 (upper and lower sides correspond to expansion and compression, respectively), a solid line B indicates changes in the moving speed of the piston 16, a broken line C indicates changes in the damping force, a solid line D indicates changes in the opening degree of the valve element 54 of the expansion side damping force control valve 31, and a solid line E indicates changes in the opening degree of the valve element 54 of the compression side damping force control valve 92. In FIG. 7, symbol F corresponds to the period when the hydraulic shock absorber 13 is in the expansion stroke, and symbol G corresponds to the period when the hydraulic shock absorber 13 is in the compression stroke.

As shown in FIG. 7, the expansion side damping force control valve 31 is fully closed when the hydraulic shock absorber 13 is in the compression stroke G. The expansion side damping force control valve of a conventional hydraulic shock absorber is opened during the compression stroke G as indicated by a dot dashed line d in FIG. 7, which causes the damping force to be unstable during the period indicated by symbol b in the same drawing. However, the construction of this embodiment allows the expansion side damping force control valve 31 to be on standby as closed during the compression stroke G.

On the other hand, the expansion side damping force control valve 92 is fully closed when the hydraulic shock absorber 13 is in the expansion stroke F. The compression side damping force control valve of a conventional hydraulic shock absorber is opened during the expansion stroke F as indicated by a dot dashed line e in FIG. 7, which causes the damping force to be unstable during the period indicated by symbol a in the same drawing. However, the construction of this embodiment allows the compression side damping force control valve 92 to be on standby as closed during the expansion stroke F.

Third Embodiment

Figure 8:
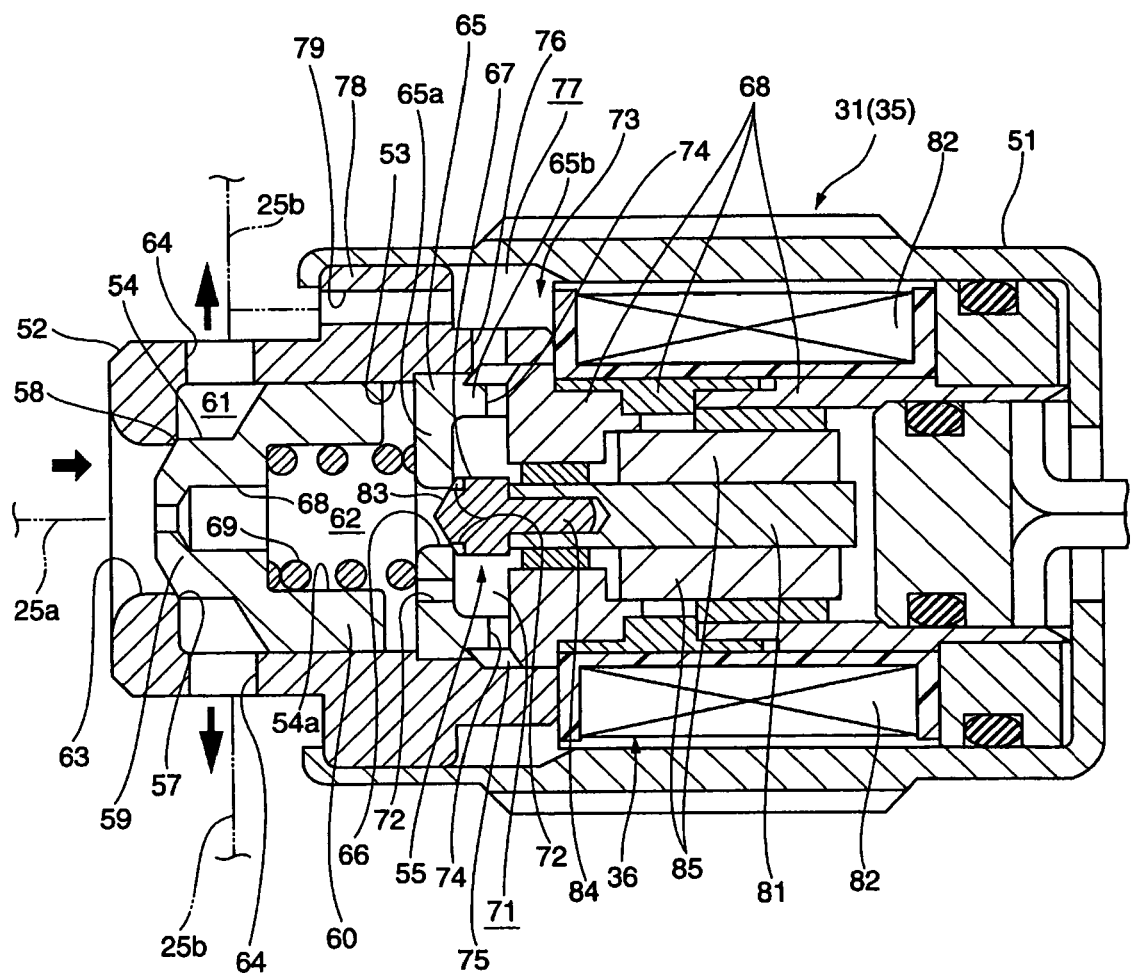
FIG. 8 is a sectional view of another embodiment of the damping force control valve.

The pressure conduction path 72 of the expansion side damping force control valve 31 and the compression side damping force control valve 92 can be provided in the pilot valve 55 as shown in FIG. 8.

FIG. 8 is a sectional view of another embodiment of the damping force control valve. In the drawing, components identical or equivalent to those described in relation to FIGS. 1 to 7 are denoted by the same reference numerals, and their detailed descriptions will not be repeated as appropriate.

As shown in FIG. 8, the valve element 67 of the pilot valve 55 is formed with pressure conduction paths 72, which are notches or cutouts provided in portions of the tapered surface 83, which contact the opening edge of the through hole 66. A plurality of the pressure conduction paths 72 are provided at intervals around the circumference of the valve element 67.

In one aspect, such a construction with the pressure conduction paths 72 provided in the valve element 67 also produces the same effect as the first and second embodiments.

Fourth Embodiment

In the embodiments described above, the hydraulic damping force control unit according to the present invention has been illustrated as being applied to a rear cushion unit for a motorcycle. The hydraulic damping force control unit according to the present invention, however, can also be applied to a telescopic front fork of vehicles, such as motorcycles or three wheelers. Such an embodiment will be described in detail with reference to FIG. 9.

Figure 9:
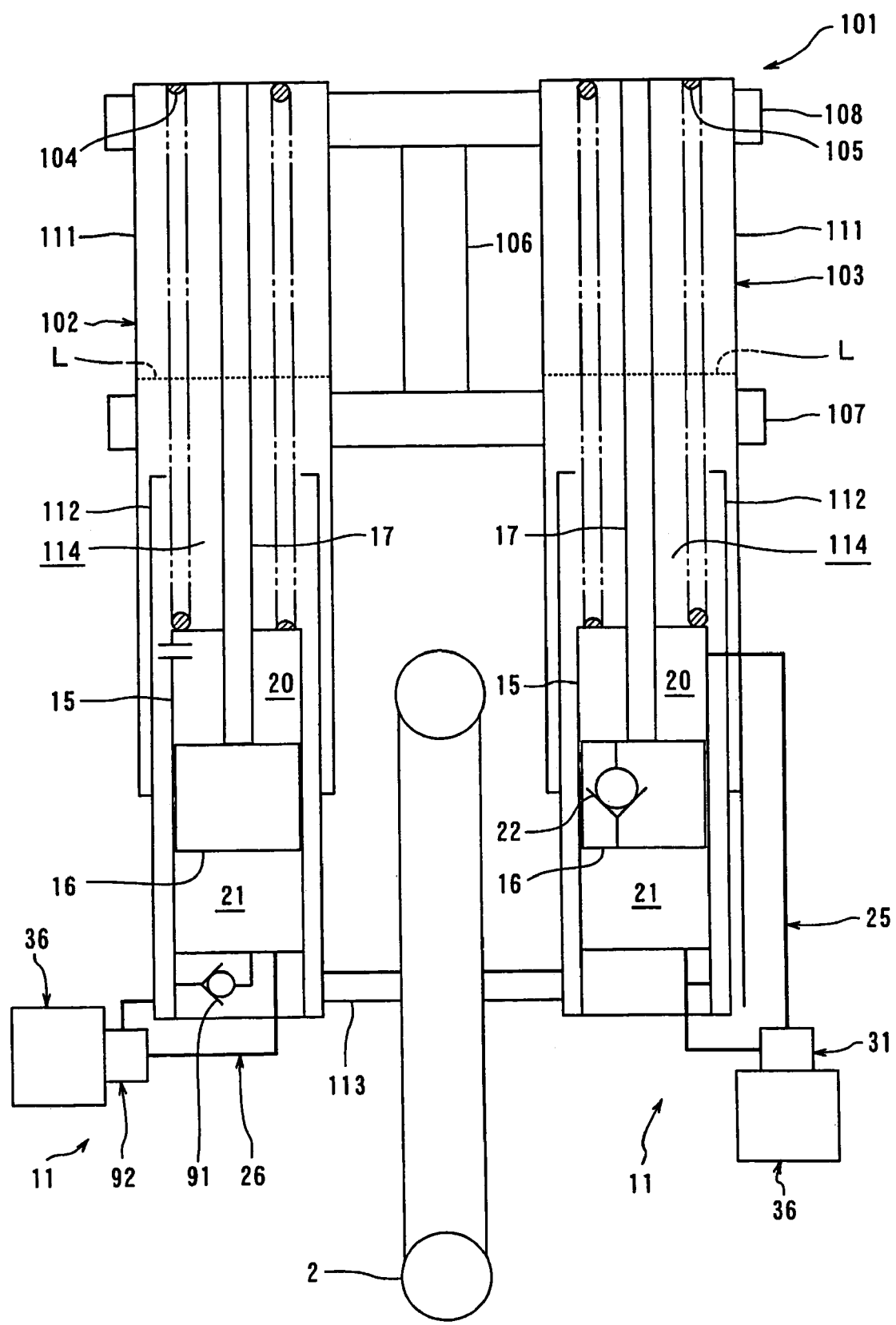
FIG. 9 is a diagram showing the construction of a front fork having the hydraulic damping force control unit according to the present invention.

FIG. 9 is a diagram showing the construction of a front fork having the hydraulic damping force control unit according to the present invention. In the drawing, components identical or equivalent to those described in relation to FIGS. 1 to 8 are denoted by the same reference numerals, and their detailed descriptions will not be repeated as appropriate.

As shown in FIG. 9, a front fork 101 is constructed with paired left and right hydraulic shock absorbers 102 and 103, paired left and right compression coil springs 104 and 105, an under bracket 107 and an upper bracket 108 coupling the left and right hydraulic shock absorbers 102 and 103 with each other and connected to a steering shaft 106, and so forth.

The hydraulic shock absorbers 102 and 103 include an outer tube 111 fixed to the under bracket 107 and the upper bracket 108, and an inner wall 112 movably fitted and inserted in the outer tube 111. The inside of the outer tube 111 and the inner tube 112 is filled with hydraulic fluid to a fluid level L.

A hydraulic cylinder 15 is fixed inside the inner tube 112. The inner tube 112 supports a wheel shaft 113 of the front wheel 2. The compression coil springs 104 and 105 are elastically mounted between the upper end of the hydraulic cylinder 15 and the upper end of the outer tube 111. The piston rod 17 of the hydraulic cylinder 15 is fixed to the upper end of the outer tube 111.

The rod side fluid chamber 20 of the hydraulic cylinder 15 located on the left side in FIG. 9 is connected to a fluid chamber 114 in the inner tube 112. The head side fluid chamber 21 of the same hydraulic cylinder 15 is connected to the fluid chamber 114 through the second fluid path 26 and the compression side damping force control valve 92. The hydraulic cylinder 15 is provided with the check valve 91 which allows hydraulic fluid to flow from the fluid chamber 114 into the head side fluid chamber 21 only, disposed between the head side fluid chamber 21 and the fluid chamber 114 in the inner tube 112.

The rod side fluid chamber 20 of the hydraulic cylinder 15 located on the right side in FIG. 9 is connected to the head side fluid chamber 21 and a fluid chamber 114 in the inner tube 112 through the first fluid path 25 and the expansion side damping force control valve 31. The piston 16 of the right hydraulic cylinder 15 is provided with the check valve 22 which allows hydraulic fluid to flow from the head side fluid chamber 21 to the rod side fluid chamber 20 only.

The left hydraulic shock absorber 102 and the right hydraulic shock absorber 103 of the front fork 101 move in the same direction at the same time. When the hydraulic shock absorbers 102 and 103 are in the compression stroke, the compression side damping force control valve 92 of the left hydraulic shock absorber 102 generates damping force. When they are in the expansion stroke, the expansion side damping force control valve 31 of the right hydraulic shock absorber 103 generates damping force. In this embodiment, also, when the hydraulic shock absorbers 102 and 103 are in the compression stroke, the expansion side damping force control valve 31 is on standby as closed, and when they are in the expansion stroke, the compression side damping force control valve 92 is on standby as closed. Thus, this embodiment produces the same effect as the foregoing embodiments.

In the front fork 101 of this embodiment, since one hydraulic shock absorber 102 generates damping force in the compression stroke, and the other hydraulic shock absorber 103 generates damping force in the expansion stroke, damping force can be generated in both the compression stroke and the expansion stroke, using the two hydraulic cylinders 15 and 15 and the two damping force control units 11 and 11. Thus, the size of pistons and rods can be selected independently of each other, between the hydraulic shock absorber 102, which generates damping force in the compression stroke, and the hydraulic shock absorber 103, which generates damping force in the expansion stroke.

Fifth Embodiment

In the embodiments described above, the hydraulic damping force control unit according to the present invention has been illustrated as being connected to a hydraulic cylinder. The hydraulic damping force control unit according to the present invention, however, can also be applied to a rotary damper as shown in FIG. 10.

Figure 10:
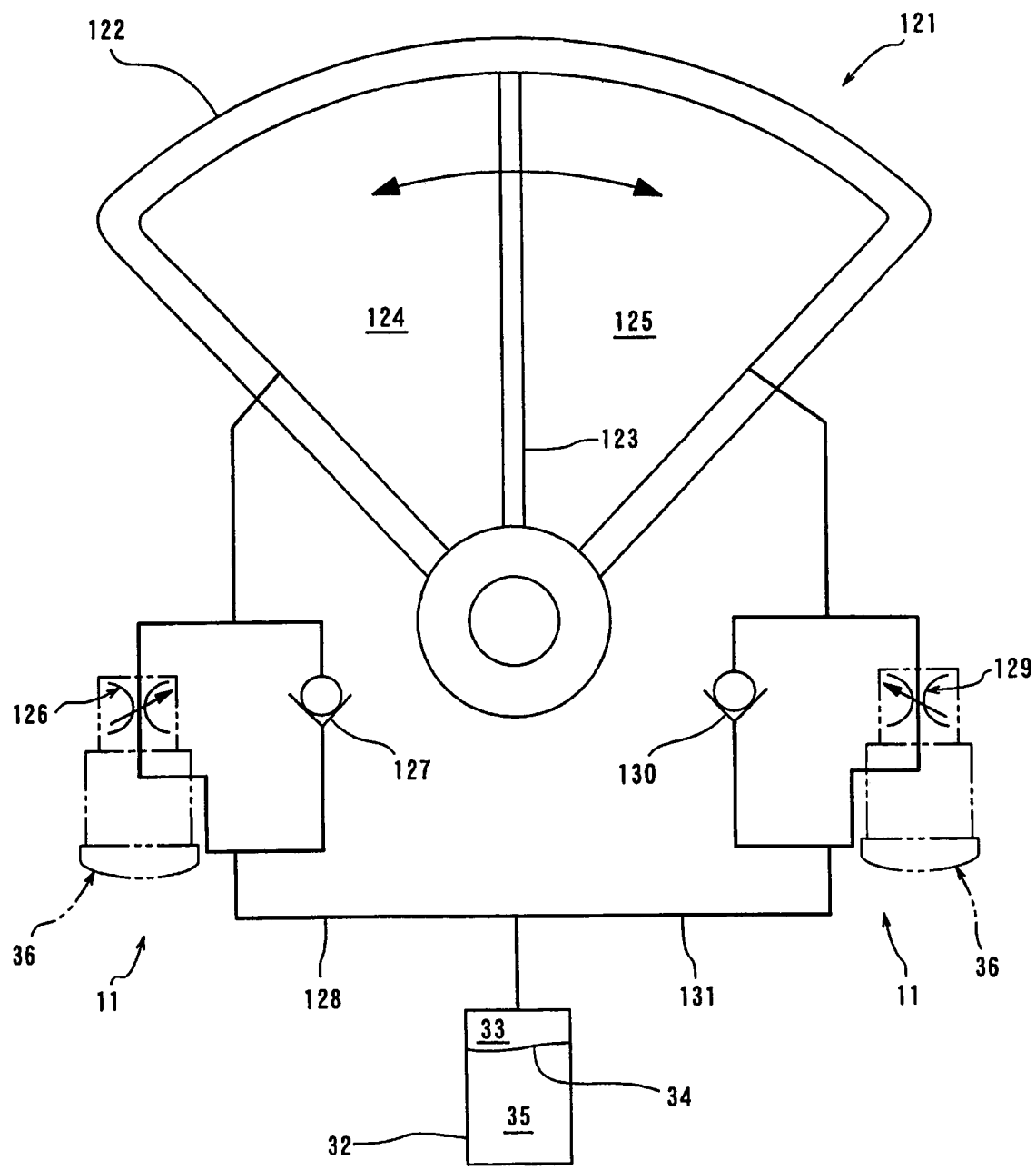
FIG. 10 is a diagram showing the construction of another embodiment where the hydraulic damping force control unit according to the present invention is used in a rotary damper.
Figure 11:
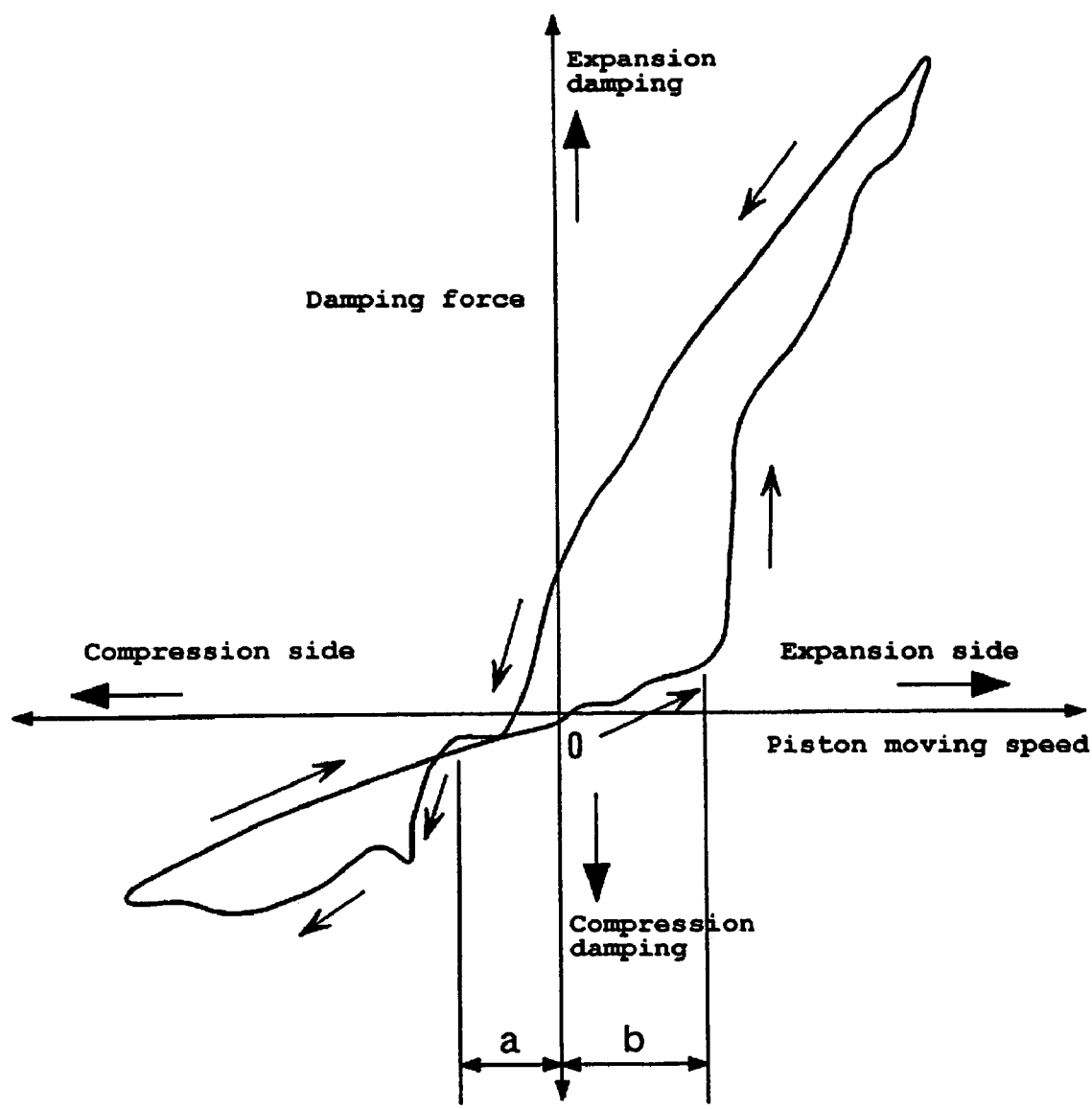
FIG. 11 is a graph showing the relationship between the moving speed of a piston and the damping force.

FIG. 10 is a diagram showing the construction of another embodiment where the hydraulic damping force control unit according to the present invention is used in a rotary damper. In the drawing, components identical or equivalent to those described in relation to FIGS. 1 to 9 are denoted by the same reference numerals, and their detailed descriptions will not be repeated as appropriate.

As shown in FIG. 10, a rotary damper 121 includes a housing 122 inside of which is filled with hydraulic fluid, and a vane 123 provided in the housing 122 for swinging movement. The vane 123 constitutes the movable partition wall of the invention of claim 4. The inside of the housing 122 is defined by the vane 123 into a first fluid chamber 124 and a second fluid chamber 125. The vane 123 is structured to swing together with a member to be shock absorbed (not shown) such as, for example, a steering shaft of a motorcycle.

The first fluid chamber 124 is connected to the fluid chamber 33 of the accumulator 32, through a first damping force control valve 126, a first check valve 127, and a first fluid path 128. The second fluid chamber 125 is also connected to the fluid chamber 33 of the accumulator 32, through a second damping force control valve 129, a second check valve 130, and a second fluid path 131.

The first damping force control valve 126 and the first check valve 127 are connected in parallel with each other, with their one ends connected to the first fluid chamber 124 and their other ends connected to the first fluid path 128. The second damping force control valve 129 and the second check valve 130 are also connected in parallel with each other, with their one ends connected to the second fluid chamber 125 and their other ends connected to the second fluid path 131.

The first damping force control valve 126 and the second damping force control valve 129 are structured in the same way as the expansion side damping force control valve 31 (compression side damping force control valve 92) used in the first to fourth embodiments. Their upstream hole 63 is connected to the first fluid chamber 124 or the first fluid chamber 125. The first and second check valves 127 and 130 are constructed to allow hydraulic fluid to flow from the first fluid path 128 or the second fluid path 131 to the first fluid chamber 124 or the second fluid chamber 125 only. The accumulator 32 is provided to compensate for volume changes of hydraulic fluid due to temperature changes.

In the constructed rotary damper 121, the first damping force control valve 126 generates damping force in a stroke where the vane 123 swings toward the left in the drawing to reduce the capacity of the first fluid chamber 124, and the second damping force control valve 129 generates damping force in a stroke where the vane 123 swings toward the right in the drawing to reduce the capacity of the second fluid chamber 125. In the stroke where the vane 123 moves toward the left in the drawing as described above, hydraulic fluid which has passed through the second check valve 130 flows into the second fluid chamber 125. At this time, since the hydraulic pressure on the upstream side of the second check valve 130 can be prevented from being increased with the practice of the present invention, the second damping force control valve 129 is closed. Thus, the second damping force control valve 129 generates damping force right from the moment when the moving direction of the vane 123 has changed and the vane 123 has begun to move toward the right in the drawing.

On the other hand, in the stroke where the vane 123 moves toward the right in the drawing, hydraulic fluid, which has passed through the first check valve 127, flows into the first fluid chamber 124. At this time, since the hydraulic pressure on the upstream side of the first check valve 127 can be prevented from being increased with the practice of the present invention, the first damping force control valve 126 is closed. Thus, the first damping force control valve 126 generates damping force right from the moment when the moving direction of the vane 123 has changed and the vane 123 has begun to move toward the left in the drawing.

Thus, in one aspect, the rotary damper 121 also produces the same effect as the foregoing embodiments.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A hydraulic damping force control unit comprising:
   a poppet valve for opening and closing a fluid path;
   a pilot pressure chamber defined from the fluid path by a valve element of the poppet valve;
   damping force setting means for increasing and decreasing a hydraulic pressure in the pilot pressure chamber; and
   a check valve provided in the fluid path to allow pressurized fluid to flow from a downstream side to an upstream side of the poppet valve only,
   wherein the hydraulic damping force control unit further unit comprises a communication path for communication between the fluid path downstream of the poppet valve and the pilot pressure chamber, and
   wherein when hydraulic pressure of the fluid path downstream of the poppet valve is higher than that of the fluid path upstream of the poppet valve, the valve element is moved in a closed direction by hydraulic pressure through the communication path.

2. A hydraulic shock absorber having the hydraulic damping force control unit of claim 1 in at least one of a fluid path through which hydraulic fluid flows out of a rod side fluid chamber of a hydraulic cylinder and a fluid path through which hydraulic fluid flows out a head side fluid chamber of the hydraulic cylinder.

3. A front fork for a vehicle having the hydraulic damping force control unit of claim 1 in each of paired left and right hydraulic shock absorbers, wherein the damping force control unit is connected to a rod side fluid chamber in one of the paired left and right hydraulic shock absorbers, and the damping force control unit is connected to a head side fluid chamber in the other of the paired left and right hydraulic shock absorbers.

4. A hydraulic rotary damper having the hydraulic damping force control unit of claim 1 connected to at least one of two fluid chambers defined by a movable partition wall which swings in conjunction with a member to be shock absorbed.

* * * * *